United States Patent
Parag et al.

(10) Patent No.: US 10,956,919 B2
(45) Date of Patent: Mar. 23, 2021

(54) INTERACTIVE VISUAL STORAGE CAPACITY FORECASTING

(71) Applicant: INTERNATIONAL BUSINESS MACHINES CORPORATION, Armonk, NY (US)

(72) Inventors: Nadav Parag, Rehovot (IL); Tamir Riechberg, Hod-HaSharon (IL); Vladimir Shalikashvili, Petah-Tiqwa (IL); Moshe Weiss, Petah-Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 833 days.

(21) Appl. No.: 14/573,587

(22) Filed: Dec. 17, 2014

(65) Prior Publication Data
US 2016/0180356 A1 Jun. 23, 2016

(51) Int. Cl.
*G06Q 30/02* (2012.01)
*G06Q 10/06* (2012.01)
*G06F 3/06* (2006.01)
*G06F 11/34* (2006.01)

(52) U.S. Cl.
CPC ....... *G06Q 30/0202* (2013.01); *G06F 3/0605* (2013.01); *G06F 11/3457* (2013.01); *G06Q 10/06375* (2013.01)

(58) Field of Classification Search
None
See application file for complete search history.

(56) References Cited

U.S. PATENT DOCUMENTS

| | | | |
|---|---|---|---|
| 6,378,039 B1 * | 4/2002 | Obara | G06F 3/0601 711/114 |
| 7,024,517 B1 | 4/2006 | Zahavi | |
| 7,392,360 B1 | 6/2008 | Aharoni et al. | |
| 7,506,040 B1 * | 3/2009 | Rabe | H04L 43/0817 709/216 |
| 7,783,510 B1 | 8/2010 | Gilgur et al. | |

(Continued)

OTHER PUBLICATIONS

Bedoya et al. "End to End Performance Management on IBM i", ibm.com/redbooks, Nov. 2009 (Year: 2009).*

(Continued)

*Primary Examiner* — Jerry O'Connor
*Assistant Examiner* — Shelby A Turner
(74) *Attorney, Agent, or Firm* — Griffiths & Seaton PLLC

(57) ABSTRACT

Methods, computing systems and computer program products implement embodiments of the present invention that include presenting, on a display, multiple storage objects and their respective current utilizations, and forecasting a respective subsequent utilization for each of the storage objects at each of one or more future times. Examples of the storage objects include of a storage facility having multiple sites, one or more storage systems at a given site, storage pools in the storage systems, and logical volumes in the storage pools. Upon receiving a first input indicating a change to the multiple storage objects, and receiving a second input indicating a given future time, the respective forecasted subsequent utilizations of the changed multiple storage objects at the given future time is presented on a display. Examples of changes to the storage objects include adding an additional storage object and moving or resizing a storage object.

8 Claims, 4 Drawing Sheets

(56) References Cited

U.S. PATENT DOCUMENTS

| | | | |
|---|---|---|---|
| 7,788,127 B1 | 8/2010 | Gilgur et al. | |
| 7,870,360 B2 | 1/2011 | Johnson et al. | |
| 7,924,874 B2* | 4/2011 | Powers | G06Q 10/10 |
| | | | 370/235 |
| 8,443,011 B2* | 5/2013 | Kandlikar | G06F 3/0481 |
| | | | 707/805 |
| 8,661,182 B2* | 2/2014 | Behera | G06F 9/455 |
| | | | 711/6 |
| 9,047,574 B2* | 6/2015 | Villeneuve | G06F 17/30398 |
| 9,128,995 B1* | 9/2015 | Fletcher | G06F 3/04842 |
| 9,210,178 B1* | 12/2015 | Roth | H04L 63/105 |
| 9,383,892 B2* | 7/2016 | Kandlikar | G06F 3/0481 |
| 9,400,739 B2* | 7/2016 | Cheng | G06F 9/466 |
| 9,400,740 B2* | 7/2016 | Cheng | G06F 9/466 |
| 9,569,569 B1* | 2/2017 | Colon | G06F 11/1076 |
| 9,679,402 B1* | 6/2017 | Davis | G06F 11/3452 |
| 10,019,496 B2* | 7/2018 | Bingham | G06F 16/22 |
| 10,114,663 B2* | 10/2018 | Bingham | G06F 9/45533 |
| 2004/0179528 A1* | 9/2004 | Powers | G06Q 10/06 |
| | | | 370/392 |
| 2006/0150122 A1* | 7/2006 | Hintermeister | G06F 9/451 |
| | | | 715/833 |
| 2007/0198328 A1* | 8/2007 | Fuller | G06Q 10/00 |
| | | | 711/170 |
| 2009/0276202 A1* | 11/2009 | Susarla | H04L 41/145 |
| | | | 703/21 |
| 2009/0276203 A1* | 11/2009 | Everhart | G06F 11/3457 |
| | | | 703/21 |
| 2010/0106933 A1 | 4/2010 | Kamila et al. | |
| 2011/0078395 A1* | 3/2011 | Okada | G06F 3/065 |
| | | | 711/162 |
| 2011/0302386 A1* | 12/2011 | Arakawa | G06F 3/0605 |
| | | | 711/170 |
| 2012/0278512 A1* | 11/2012 | Alatorre | G06F 3/0605 |
| | | | 710/33 |
| 2012/0324092 A1* | 12/2012 | Brown | G06F 9/5044 |
| | | | 709/224 |
| 2013/0204960 A1* | 8/2013 | Ashok | G06F 3/067 |
| | | | 709/213 |
| 2013/0290538 A1* | 10/2013 | Gmach | G06F 11/3457 |
| | | | 709/226 |
| 2014/0109014 A1* | 4/2014 | Kandlikar | G06F 3/0481 |
| | | | 715/853 |
| 2014/0146648 A1* | 5/2014 | Alber | G11B 27/002 |
| | | | 369/53.1 |
| 2015/0127812 A1* | 5/2015 | Cheng | G06F 9/466 |
| | | | 709/224 |
| 2015/0127920 A1* | 5/2015 | Cheng | G06F 9/466 |
| | | | 711/170 |
| 2015/0193246 A1* | 7/2015 | Luft | G06F 9/45533 |
| | | | 718/1 |
| 2016/0188370 A1* | 6/2016 | Razin | G06F 11/3495 |
| | | | 718/104 |
| 2016/0306563 A1* | 10/2016 | Cheng | G06F 9/466 |
| 2016/0306564 A1* | 10/2016 | Cheng | G06F 9/466 |

OTHER PUBLICATIONS

Anonymous, "A Method for Relating and Displaying IT Capacity Forecasts with Business Metadata", IP.com Prior Art Database Technical Disclosure, Aug. 28, (Year: 2007).*

Gibbs et al., "IBM Eserver pSeries Sizing and Capacity Planning", ibm.com/redbooks, March (Year: 2004).*

Hsu, Windsor W., and Alan Jay Smith. "The performance impact of I/O optimizations and disk improvements." IBM Journal of Research and Development 48, No. 2 (2004): 255-289. (Year: 2004).*

Zeng, Lingfang, Dan Feng, Fang Wang, Lei Tian, and Zhan Shi. "Storage Active Service: Model, Method and Practice." In 2006 Japan-China Joint Workshop on Frontier of Computer Science and Technology, pp. 46-53. IEEE, (Year: 2006).*

Solarwinds "Virtualization Manager: Capacity Planning", Video https://www.solarwinds.com/resources/video/proactive-capacity-planning-with-solarwinds-virtualization-manager (Year: 2011).*

Racherla et al. "IBM Midrange System Storage Implementation and Best Practices Guide", Redbooks, Mar. 2010 (Year: 2010).*

"MonoSphere Introduces Storage Horizon 3.0" 2 pages, retrieved Jul. 28, 2014 from: http://www.businesswire.com/news/home/20070129005399/en/MonoSphere-Introduces-Storage-Horizon-3.0#.U9bJtqjD6X1, BusinessWire, Jan. 29, 2007.

* cited by examiner

US 10,956,919 B2

INTERACTIVE VISUAL STORAGE CAPACITY FORECASTING

FIELD OF THE INVENTION

The present invention relates generally to storage facility management, and specifically to a graphical user interface configured forecast future utilization of storage objects in a storage system.

BACKGROUND

Multi-site storage facilities typically comprise multiple granularities. For example, a storage facility may comprise multiple sites, each of the sites comprising multiple storage systems such as storage controllers. Each of the storage systems may store multiple storage pools, and the storage pools can be used to implement thick and/or thin provisioning for logical volumes. Utilization of the storage facility can be measured at different granularities such as the storage facility, a give site in the storage facility, a group of storage systems at a given site, a given storage system, a given pool in a given storage system, and a given volume in a given pool.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including presenting, on a display, multiple storage objects and their respective current utilizations, forecasting a respective subsequent utilization for each of the storage objects at each of one or more future times, receiving, by a processor, a first input indicating a change to the multiple storage objects, receiving a second input indicating a given future time, and presenting, on the display, the respective forecasted subsequent utilizations of the changed multiple storage objects at the given future time.

There is also provided, in accordance with an embodiment of the present invention an apparatus, including multiple storage systems, a display, and a management processor configured to present, on the display, multiple storage objects and their respective current utilizations, to forecast a respective subsequent utilization for each of the storage objects at each of one or more future times, to receive a first input indicating a change to the multiple storage objects, to receive a second input indicating a given future time, and to present, on the display, the respective forecasted subsequent utilizations of the changed multiple storage objects at the given future time.

There is further provided, in accordance with an embodiment of the present invention a computer program product, the computer program product including a non-transitory computer readable storage medium having computer readable program code embodied therewith, the computer readable program code including computer readable program code configured to present, on a display, multiple storage objects and their respective current utilizations, computer readable program code configured to forecast a respective subsequent utilization for each of the storage objects at each of one or more future times, computer readable program code configured to receive, by a processor, a first input indicating a change to the multiple storage objects, computer readable program code configured to receive a second input indicating a given future time, and computer readable program code configured to present, on the display, the respective forecasted subsequent utilizations of the changed multiple storage objects at the given future time.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for presenting an interactive forecast of storage object utilization. Examples of storage objects whose utilization can be forecasted include, but are not limited to, a storage facility comprising multiple sites, a given site comprising multiple storage systems, a group of the storage systems at a given site, a given storage system comprising one or more storage pools, and a given storage pool comprising one or more logical volumes.

In embodiments of the present invention utilization comprises a ratio of a first amount of space currently used by a given storage object to a second amount of space that is available to be used by the given storage object. For example, if one or more logical volumes are currently using 900 storage regions (i.e., blocks or partitions) from a storage pool that has 1,000 storage regions, then the storage pool is 90% utilized.

As described hereinbelow, multiple storage objects and their respective current utilizations can be presented on a display, and a respective subsequent (i.e., future) utilization can be forecasted for each of the storage objects. In some embodiments, the respective subsequent utilizations can be forecasted for one or more future times (i.e., dates).

Upon receiving inputs indicating a change to the multiple storage objects and a given future time, the respective forecasted subsequent utilizations of the changed storage objects at the given future time can be presented. Examples of changes to the multiple storage objects include, but are not limited to, moving a given storage object from a first location to a second location (e.g., moving a storage pool from a first storage controller to a second storage controller, or moving a logical volume from a first storage pool to a second storage pool), creating an additional storage object (e.g., creating an additional storage pool in a given storage controller), and resizing a given storage object from a first size to a second size.

Therefore, systems implementing embodiments of the present invention can help a system administrator identify future potential storage bottlenecks, and proactively reconfigure the storage objects in the storage system so as to minimize or eliminate the impact of the forecasted bottlenecks.

Figure 1:
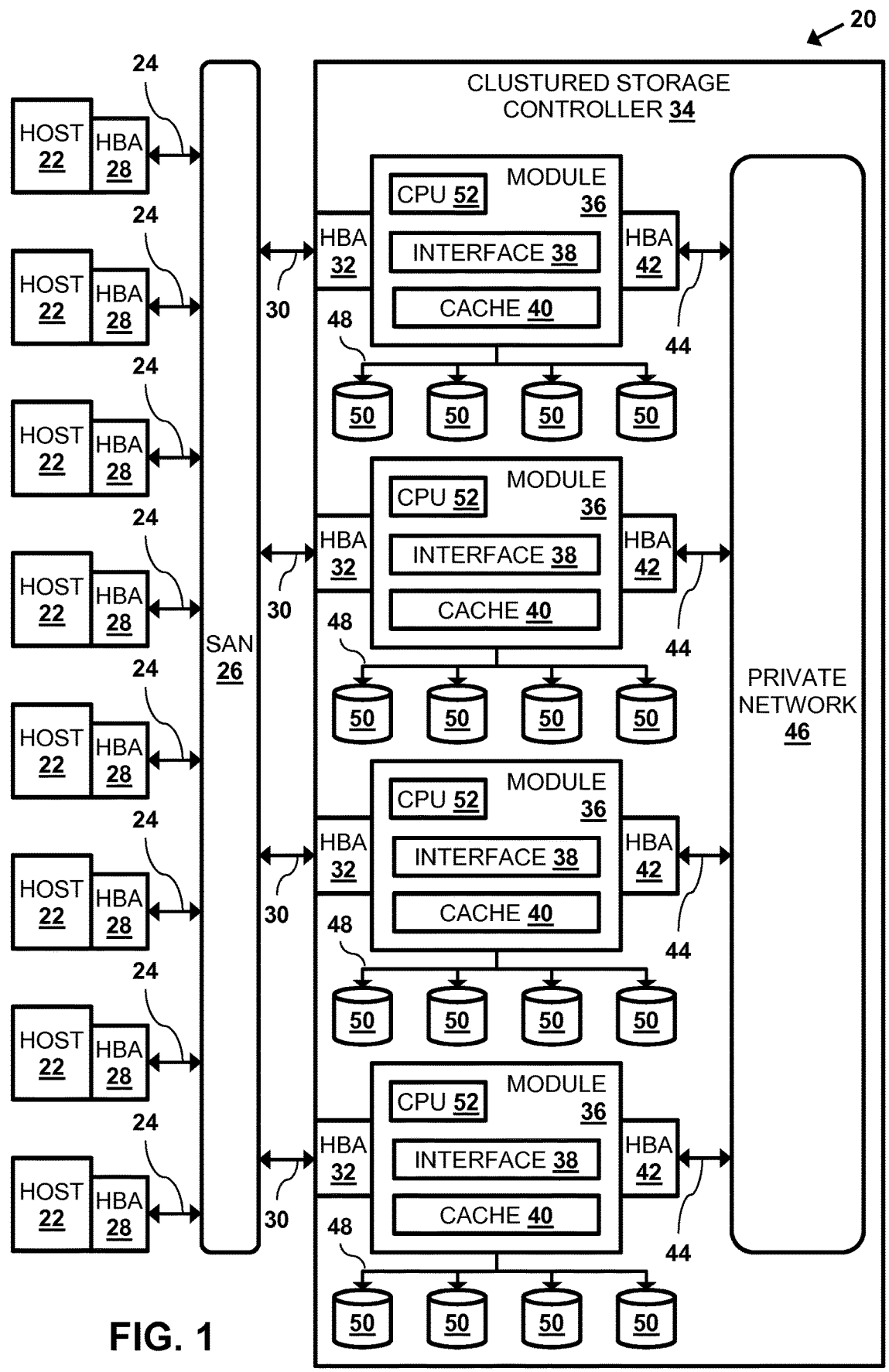
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a storage processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four storage modules 36 and each of the modules coupled to four storage devices 50, a given storage controller 34 comprising any multiple of storage modules 36 coupled to any plurality of storage devices 50 is considered to be with the spirit and scope of the present invention.

Figure 2:
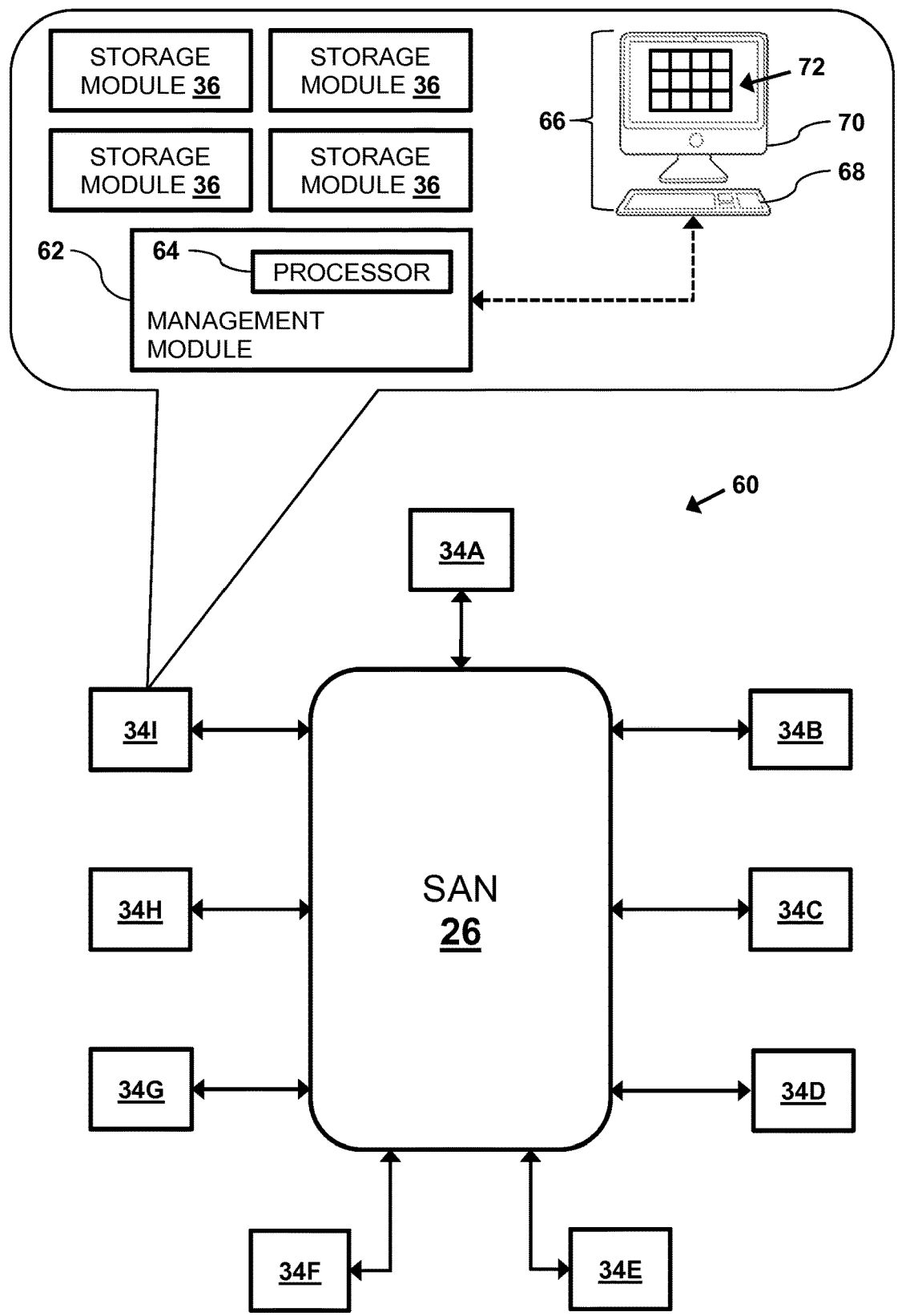
FIG. 2 is a block diagram that schematically illustrates a site comprising multiple storage controllers, in accordance with an embodiment of the present invention.

FIG. 2 is a block diagram that schematically illustrates a site 60 comprising multiple storage controllers 34, in accordance with an embodiment of the present invention. In the example shown in FIG. 2, storage controllers 34 and their respective components (e.g., storage devices 50) can be differentiated by appending a letter to the identifying numeral, so that the storage controllers comprise storage controller 34A-34I.

In addition to storage modules 36, each storage controller 34 comprises a management module 62 that is configured to manage storage modules 36. Management module 62 comprises a management processor 64 and a management console 66 comprising a display 70 and an input device such as a keyboard 68. In operation, processor 64 presents a graphical user interface (GUI) 74 on display 70. As described in the description referencing FIG. 3 hereinbelow, a system administrator (not shown) can interact with GUI 74 in order to view forecasted utilizations of storage objects (e.g., logical volumes and/or storage pools) stored on storage devices 50.

Processors 52 and 64 comprise general-purpose central processing units (CPU) or special-purpose embedded processors, which are programmed in software or firmware to carry out the functions described herein. The software may be downloaded to modules 36 and 62 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Interactive Storage Utilization Forecast

Figure 3:
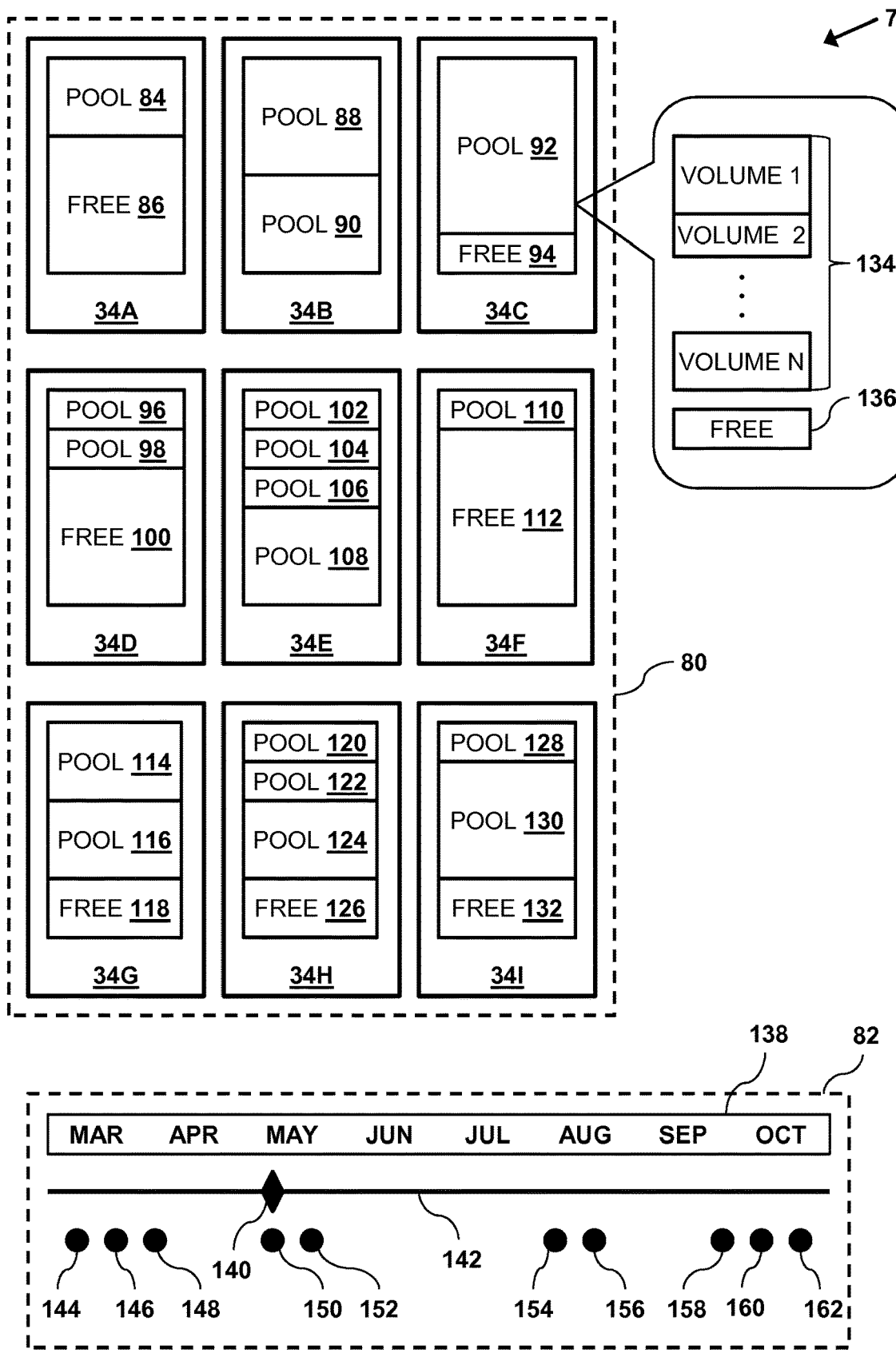
FIG. 3 is a block diagram that schematically illustrates a graphical interface configured to forecast utilization of storage pools in the site's storage controllers, in accordance with an embodiment of the present invention.

FIG. 3 is a block diagram that schematically illustrates GUI 72, in accordance with an embodiment of the present invention. GUI 72 comprises a presentation section 80 and a user interaction section 82.

In the example shown in FIG. 3, processor 64 presents site 60 and its respective storage controllers 34A-34I in presentation section 80. Processor 64 also presents, for each given storage controller how storage regions (also known as blocks or partitions) are being utilized at a given time as follows:

Storage controller 34A comprises a storage pool 84 (i.e., space allocated on storage devices 50A for use by logical volumes) and free space 86 (i.e., unallocated storage units on storage devices 50A).

Storage controller 34B comprises storage pools 88 and 90. There is no free space on storage controller storage devices 50B at the given time being presented on display 70.

Storage controller 34C comprises storage pool 92 and free space 94.

Storage controller 34D comprises storage pools 96 and 98, and free space 100.

Storage controller 34E comprises storage pools 102, 104, 106 and 108.

Storage controller 34F comprises storage pool 110 and free space 112.

Storage controller 34G comprises storage pools 114 and 116 and free space 118.

Storage controller 34H comprises storage pools 120, 122 and 124, and free space 126.

Storage controller 34I comprises storage pools 128 and 130, and free space 132.

As described supra, each of the storage pools on storage devices 50 can be allocated to logical volumes 134. In addition to logical volumes 134, free space 136 comprises any storage regions in a given storage pool that are not allocated to a given volume 134. While the example in FIG. 3 shows processor 64 presenting utilizations of storage devices 50 in site 60, the management processor can present different storage utilizations i.e., granularities) such as:

Utilizations of each site 60 in a storage facility comprising multiple sites 60.

Utilizations of a group of storage controllers 34 in a given site 60.

Utilization of a single storage controller 34 in a given site 60.

Utilization of a given storage pool (e.g., pool 92) in a given storage controller 34.

Utilization of a given volume 134 (i.e., how much data is stored in the given volume at a given time).

In operation, processor 64 can collect historical utilization data for storage objects (e.g., site 60, storage controller 34, the storage pools and the logical volumes), and analyze the historical data to detect any trends in the respective utilizations. In some embodiments, processor 64 can extend the detected trends in order to forecast the respective utilizations of each of the storage objects at one or more times in the future.

Interaction section 82 comprising dates 138 and a slider control 140 that processor 64 can move along a track bar 142 in response to input received from an input device such as keyboard 68 or a mouse (not shown). In other words, interaction section 82 comprises an "interactive timeline" for site 60. Dates 138 may comprise past dates, a current date, and future dates. In embodiments of the present invention, as processor 64 moves slider control along track bar 142 (i.e., in response to the inputs received from console 66), the management processor presents the current utilizations of the storage objects at the indicated date as follows:

If the indicated date comprises a prior date, then processor 64 presents the utilization of the storage objects at the prior date based on the collected historical data.

If the indicated date comprises the current date, then processor 64 presents the current utilization of the storage objects.

If the indicated date comprises a future date, then processor 64 presents the utilization of the storage objects at the future date based on the forecasted data.

In some embodiments, processor 64 can define a plurality of storage states, and associate a range of utilization levels to each of the storage states. For example, if the plurality of storage states comprise "normal", "warning" and "critical", processor 64 can associate utilization levels between 0%-70% with the normal storage state, associated utilization levels between 71%-90% with the warning storage state, and associate utilization levels between 91%-100% with the critical storage state.

Additionally, to help a system administrator quickly identify any potential storage device utilization bottlenecks, processor 64 can assign different visual effects to each of the storage states, and present a given utilization of a given storage object by identifying a given storage state whose respective range of utilizations includes the given utilization, and using the assigned visual effect of the identified storage state to present the given storage object. For example, processor 64 can present storage objects having the normal storage state as green storage objects on display 70, present storage objects having the warning storage state as yellow storage objects on the display, and present storage objects having the critical storage state as yellow storage objects on the display. In the example shown in FIG. 3, processor 64 can present storage controller 34E in red, storage controller 34I in yellow and storage controller 34A in green. Other visual effects include, but are not limited to, intensity levels, sizes, blinking effects, and animation effects.

In embodiments of the present invention, a system administrator can make changes to the configuration of the storage objects and see how the change impacts the utilization forecast. While examples of changes to the multiple storage objects described herein include adding an additional storage object, moving a given storage object from a first location to a second location, and resizing a given storage object from a first size to a second size, any change to any storage object parameter is considered to be within the spirit and scope of the present invention.

In a first example, using keyboard 68, the system administrator can instruct processor 64 to add an additional storage pool (not shown) to storage controller 34F (i.e., by using storage space in free space 112). By moving slider control 140 along track bar 142 (and processor 64 presenting the forecasted utilization of storage pool 110 and the additional storage pool), the system administrator can examine how the additional storage pool impacts storage controller 34F.

In a second example, upon detecting that storage controllers 34B and 34E are forecasted to be fully utilized in "May" (as shown in FIG. 3), the system administrator can instruct, via console 66, processor 64 to move storage pool 90 from storage controller 34B to storage controller 34F, and to move storage pools 102 and 104 from storage controller 34E to storage controller 34D. Additional examples include moving a given logical volume 134 from a first of the storage pools in a first storage controller 34 to a second of the storage pools in a second storage controller 34. In embodiments where console 66 comprises a pointing device such as a mouse, the system administrator can manipulate the pointing device to "drag" storage pool 90 from storage controller 34B to storage controller 34F. By moving slider control 140 along track bar 142 (i.e., to future months 138), the system administrator can examine how the moved storage pools affect storage controllers 34B, 34D, 34E and 34F.

In some embodiments, based on the projected utilizations of storage objects in site 60, processor 64 can forecast potential problems and present the problems as marks (i.e., icons) 144, 146, 148, 150, 152, 154, 156, 158, 160 and 162. An example of a potential problem comprises a given storage controller reaching a warning or a critical state. Each of the marks corresponds to a given date 138 in the timeline, thereby notifying the system administrator of the dates where there might be utilization problems in site 60. In the example shown in FIG. 3, slider control is presented at the beginning of "May" which corresponds to marks 150. As shown in presentation section 80, processor 64 projects (i.e., in May) that storage controllers 34C and 34E will have critical storage states, and storage controllers 34G, 34H and 34I will have warning storage states.

Figure 4:
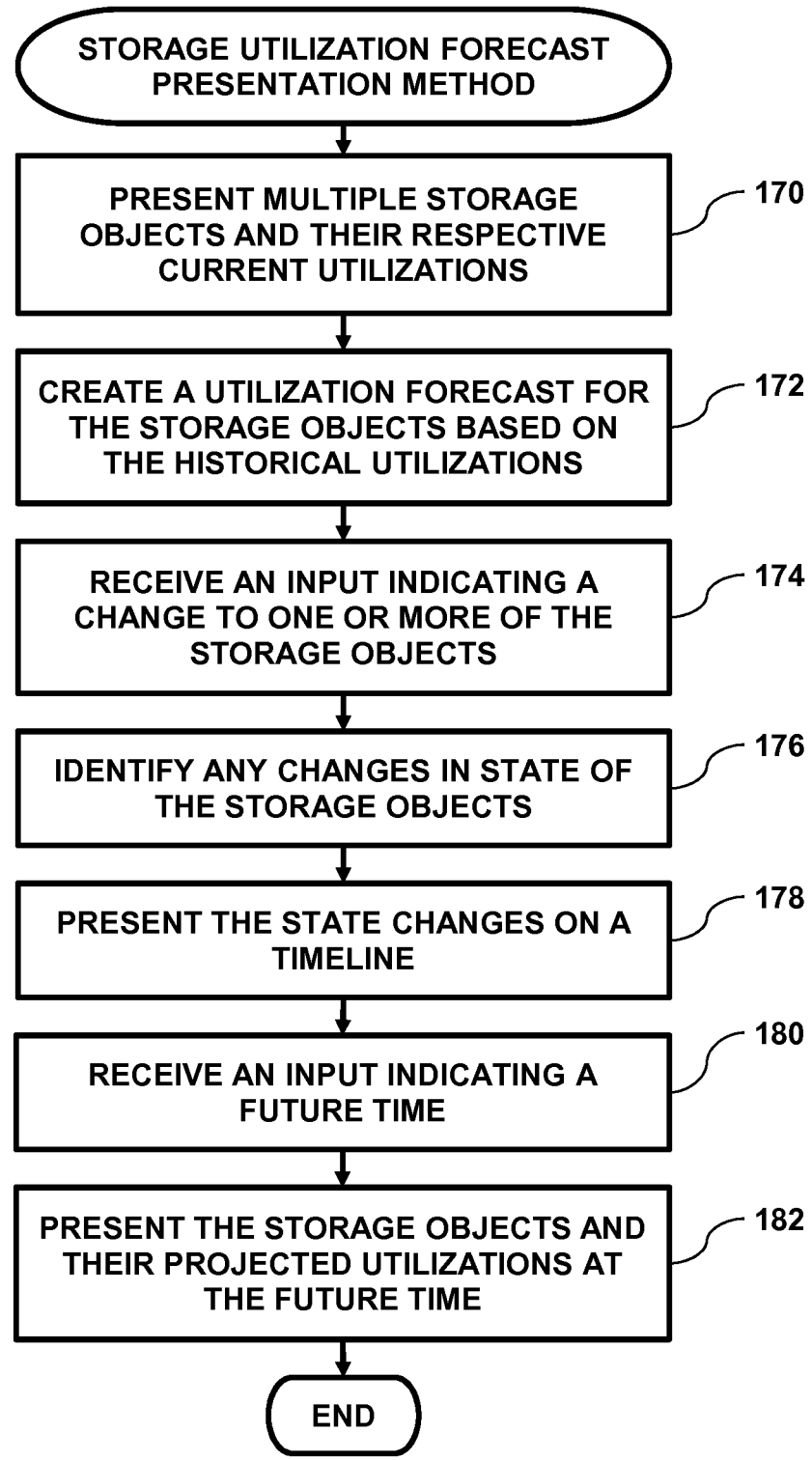
FIG. 4 is a flow diagram that schematically illustrates a method of presenting a forecast of storage object utilization, in accordance with an embodiment of the preset invention.

FIG. 4 is a flow diagram that schematically illustrates a method of presenting a forecast of storage object utilization, in accordance with an embodiment of the preset invention. While the example described in FIG. 4 describes presenting an interactive visual storage utilization forecast for storage controllers 34 in site 60, presenting interactive visual storage utilization forecasts for other storage objects is considered to be within the spirit and scope of the present invention.

In a first presentation step 170, processor 64 presents presentation section 80 and interaction section 82 on display 70, the presentation section comprising storage controllers 34A-34I in site 60. In a forecast step 172, processor 64 creates a utilization forecast for the storage controllers based on their respective historical utilizations, as described supra. For each given storage controller 34, the forecast can indicate, for each month 138, how much storage space (i.e., on storage devices 50) will be used by one or more storage pools (e.g., pools 96 and 98 on storage controller 34D), and how much space will be remaining in the free space on the given storage controller (e.g., free space 100 on storage controller 34D).

In a first receive step 174, processor 64 receives, from console 60, a first input indicating a requested change to the storage pools on the storage controllers, and the processor incorporates the requested change into the forecast. As described supra, the requested change can be a request to add an additional storage pool to a given storage controller 34 or a request to move a given storage pool from a first storage controller 34 to a second storage controller 34.

In an identification step 176, processor 64 identifies, in the forecast, any changes to states of the storage controllers. As described supra, examples of changes to a storage objects such as storage controllers 34 include, but are not limited to, adding an additional storage object (e.g., adding an additional storage pool), moving a given storage object from a first location to a second location (e.g., moving a given logical volume 134 from a first storage pool in a first storage controller 34 to a second storage pool in a second storage controller 34), and resizing a given storage object (e.g., a given storage pool) from a first size to a second size.

In a second presentation step 178, the management processor presents the state changes as marks 144-162 on display 70. As described supra, processor 64 presents each of the marks in proximity to a given month 138 where the respective state change is forecasted to transpire.

In a second receive step 180, processor 64 receives (e.g., in response to the system administrator manipulating slider control 140) an input indicating a future time (i.e., in months 138). In the example shown in FIG. 3, the system administrator has moved the pointer control to the beginning of "May". Finally, in a third presentation step 182, processor 64 presents, on display 70, the projected utilization of the storage controllers at the indicated future time (i.e., interaction section 82), and the method ends.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
presenting, on a display, multiple storage objects and their respective current utilizations;
forecasting a respective subsequent utilization for each of the storage objects at each of one or more future times;
receiving, by a processor, a first input on an interface indicating a change requested to be performed on the multiple storage objects; wherein the change to the multiple storage objects comprises at least moving a given storage object from a first storage controller selected by a user to a second storage controller selected by the user within a group of storage controllers by dragging the given storage object from an icon representative of the first storage controller to an icon representative of the second storage controller on the interface by the user using an input device; wherein each storage controller comprises a server entity distributing input/output (I/O) requests received from a plurality of hosts via a storage area network (SAN) to a plurality of physical storage devices arranged into multiple storage pools;
receiving a second input indicating a given future time;
presenting, on the display, the respective forecasted subsequent utilizations of the changed multiple storage objects at the given future time to facilitate detecting, by a system administrator, forecasted potential storage bottlenecks thereby allowing the system administrator to proactively reconfigure the multiple storage objects to mitigate the detected forecasted potential storage bottlenecks; wherein presenting the subsequent utilization of the changed multiple storage objects comprises presenting the subsequent utilization of the given storage object moved from the first storage controller to the second storage controller; and wherein presenting the subsequent utilizations of the multiple storage objects further includes presenting, on the display, the respective forecasted subsequent utilizations of the changed multiple storage objects commensurate with multiple levels of granularity, the multiple levels of granularity including:

forecasted utilizations of each site in a storage facility comprising multiple sites;

forecasted utilizations of the group of storage controllers in each site of the multiple sites at the given future time specified in the second input, wherein each storage controller in the group of storage controllers controls an independent storage subsystem at each site;

forecasted utilization of a single storage controller in each site of the multiple sites at the given future time specified in the second input;

forecasted utilization of a given storage pool in a given one of the storage controllers at the given future time specified in the second input; and forecasted utilization of a given volume within the given storage pool at the given future time specified in the second input;

presenting a timeline having the one or more future times and a slider control moving along a track bar in response to input received from the input device, the track bar indicating past dates, a current date, and future dates including the given future time; wherein presenting the subsequent utilization of the changed multiple storage objects comprises defining multiple states for each of the storage objects including a problem state, detecting change in the state of a given storage object to the problem state at one of the future times according to an effect of the change of moving the given object from the first storage controller to the second storage controller, and presenting the change in the state on the timeline according to a specific date when the problem state is forecasted to occur; and associating a range of utilizations for each of the storage states and assigning a given visual effect to each of the storage states, wherein presenting a given utilization of a given storage object comprises identifying a given storage state whose respective range of utilizations includes the given utilization and presenting the given storage object using the assigned visual effect of the identified storage state.

2. The method according to claim 1, wherein projecting the future utilization comprises collecting historical utilizations of the multiple storage objects, detecting, in the historical utilizations, a respective utilization trend for the utilization of each of the storage objects, and extending each of the detected trends to the one or more future times.

3. The method according to claim 1, wherein the change to the multiple storage objects comprises resizing a given storage object from a first size to a second size, and wherein presenting the subsequent utilization of the changed multiple storage objects comprises presenting the subsequent utilization of the resized given storage object.

4. An apparatus, comprising:
multiple storage systems;
a display; and
a management processor configured:

to present, on the display, multiple storage objects and their respective current utilizations, to forecast a respective subsequent utilization for each of the storage objects at each of one or more future times, to receive a first input on an interface indicating a change requested to be performed on the multiple storage objects; wherein the change to the multiple storage objects comprises at least moving a given storage object from a first storage controller selected by a user to a second storage controller selected by the user within a group of storage controllers by dragging the given storage object from an icon representative of the first storage controller to an icon representative of the second storage controller on the interface by the user using an input device; wherein each storage controller comprises a server entity distributing input/output (I/O) requests received from a plurality of hosts via a storage area network (SAN) to a plurality of physical storage devices arranged into multiple storage pools, to receive a second input indicating a given future time, to present, on the display, the respective forecasted subsequent utilizations of the changed multiple storage objects at the given future time to facilitate detecting, by a system administrator, forecasted potential storage bottlenecks thereby allowing the system administrator to proactively reconfigure the multiple storage objects to mitigate the detected forecasted potential storage bottlenecks; wherein presenting the subsequent utilization of the changed multiple storage objects comprises presenting the subsequent utilization of the given storage object moved from the first storage controller to the second storage controller; and wherein presenting the subsequent utilizations of the multiple storage objects further includes presenting, on the display, the respective forecasted subsequent utilizations of the changed multiple storage objects commensurate with multiple levels of granularity, the multiple levels of granularity including:

forecasted utilizations of each site in a storage facility comprising multiple sites;

forecasted utilizations of the group of storage controllers in each site of the multiple sites at the given future time specified in the second input, wherein each storage controller in the group of storage controllers controls an independent storage subsystem at each site;

forecasted utilization of a single storage controller in each site of the multiple sites at the given future time specified in the second input;

forecasted utilization of a given storage pool in a given one of the storage controllers at the given future time specified in the second input; and forecasted utilization of a given volume within the given storage pool at the given future time specified in the second input, to present a timeline having the one or more future times and a slider control moving along a track bar in response to input received from the input device, the track bar indicating past dates, a current date, and future dates including the given future time; wherein presenting the subsequent utilization of the changed multiple storage objects comprises defining multiple states for each of the storage objects including a problem state, detecting change in the state of a given storage object to the problem state at one of the future times according to an effect of the change of moving the given object from the first storage controller to the second storage controller, and presenting the change in the state on the timeline according to a specific date when the problem state is forecasted to occur, and to associate a range of utilizations for each of the storage states and assign a given visual effect to each of the storage states, wherein presenting a given utilization of a given storage object comprises identifying a given storage state whose respective range of utilizations includes the given utilization and presenting the given storage object using the assigned visual effect of the identified storage state.

5. The apparatus according to claim 4, wherein the management processor is further configured to project the future utilization by collecting historical utilizations of the multiple storage objects, detecting, in the historical utilizations, a respective utilization trend for the utilization of each of the storage objects, and extending each of the detected trends to the one or more future times.

6. The apparatus according to claim 4, wherein the management processor is further configured to change the multiple storage objects by resizing a given storage object from a first size to a second size, and wherein the management processor is further configured to present the subsequent utilization of the changed multiple storage objects by presenting the subsequent utilization of the resized given storage object.

7. A computer program product, the computer program product comprising:

a non-transitory computer readable storage medium having computer readable program code embodied therewith, the computer readable program code comprising:

computer readable program code configured to present, on a display, multiple storage objects and their respective current utilizations;

computer readable program code configured to forecast a respective subsequent utilization for each of the storage objects at each of one or more future times;

computer readable program code configured to receive, by a processor, a first input on an interface indicating a change requested to be performed on the multiple storage objects; wherein the change to the multiple storage objects comprises at least moving a given storage object from a first storage controller selected by a user to a second storage controller selected by the user within a group of storage controllers by dragging the given storage object from an icon representative of the first storage controller to an icon representative of the second storage controller on the interface by the user using an input device; wherein each storage controller comprises a server entity distributing input/output (I/O) requests received from a plurality of hosts via a storage area network (SAN) to a plurality of physical storage devices arranged into multiple storage pools;

computer readable program code configured to receive a second input indicating a given future time;

computer readable program code configured to present, on the display, the respective forecasted subsequent utilizations of the changed multiple storage objects at the given future time to facilitate detecting, by a system administrator, forecasted potential storage bottlenecks thereby allowing the system administrator to proactively reconfigure the multiple storage objects to mitigate the detected forecasted potential storage bottlenecks; wherein presenting the subsequent utilization of the changed multiple storage objects comprises presenting the subsequent utilization of the given storage object moved from the first storage controller to the second storage controller; and wherein presenting the subsequent utilizations of the multiple storage objects further includes presenting, on the display, the respective forecasted subsequent utilizations of the changed multiple storage objects commensurate with multiple levels of granularity, the multiple levels of granularity including:

forecasted utilizations of each site in a storage facility comprising multiple sites;

forecasted utilizations of the group of storage controllers in each site of the multiple sites at the given future time specified in the second input, wherein each storage controller in the group of storage controllers controls an independent storage subsystem at each site;

forecasted utilization of a single storage controller in each site of the multiple sites at the given future time specified in the second input;

forecasted utilization of a given storage pool in a given one of the storage controllers at the given future time specified in the second input;

forecasted utilization of a given volume within the given storage pool at the given future time specified in the second input; and forecasted utilization of a given volume within the given storage pool;

computer readable program code configured to present a timeline having the one or more future times and a slider control moving along a track bar in response to input received from the input device, the track bar indicating past dates, a current date, and future dates including the given future time; wherein presenting the subsequent utilization of the changed multiple storage objects comprises defining multiple states for each of the storage objects including a problem state, detecting change in the state of a given storage object to the problem state at one of the future times according to an effect of the change of moving the given object from the first storage controller to the second storage controller, and presenting the change in the state on the timeline according to ft a specific date when the problem state is forecasted to occur; and computer readable program code configured to associate a range of utilizations for each of the storage states and assign a given visual effect to each of the storage states, wherein presenting a given utilization of a given storage object comprises identifying a given storage state whose respective range of utilizations includes the given utilization and presenting the given storage object using the assigned visual effect of the identified storage state.

8. The computer program product according to claim 7, further including computer readable program code configured to change to the multiple storage objects by resizing a given storage object from a first size to a second size, and further including computer readable program code configured to present the subsequent utilization of the changed multiple storage objects by presenting the subsequent utilization of the resized given storage object.

\* \* \* \* \*